United States Patent [19]

Wadia

[11] 4,367,096

[45] Jan. 4, 1983

[54] METHOD AND APPARATUS FOR PREHEATING AND BURNING OFF COMBUSTIBLE CONSTITUENTS OF RAW MATERIAL OIL SHALE PRIOR TO INTRODUCTION OF SAME INTO A PREHEATER SYSTEM SUPPLYING A ROTARY KILN

[76] Inventor: Darius A. Wadia, 96 Marine Dr., Bombay, India

[21] Appl. No.: 310,770

[22] Filed: Oct. 13, 1981

[51] Int. Cl.$^3$ ................................................. C04B 7/02
[52] U.S. Cl. ..................................... 106/100; 432/13; 432/106
[58] Field of Search .................. 106/100, 103; 432/13, 432/106

[56] References Cited

U.S. PATENT DOCUMENTS

| | | | |
|---|---|---|---|
| 2,904,445 | 9/1959 | Sellers et al. | 106/100 |
| 3,127,455 | 3/1964 | Culbertson et al. | 106/100 |
| 3,135,618 | 6/1964 | Friese | 106/100 |
| 4,197,137 | 4/1980 | Abe et al. | 106/100 |
| 4,256,502 | 3/1981 | Lovichi et al. | 106/100 |

Primary Examiner—James Poer
Attorney, Agent, or Firm—Thomas R. Vigil

[57] ABSTRACT

The method for processing cement raw meal and oil shale by combining them in a mixture with oil shale kerogen constituting 0.5 to 2% of the mixture by weight. This mixture is supplied to a separate heating chamber where it is preheated so as to heat the cement raw meal component and burn off the combustible component of the oil shale. The raw meal is heated in the chamber to a temperature between 100° and 850° C. The heated mixture is then fed to a preheater system having an output coupled to a rotary kiln. In one embodiment the preheater system includes four stages and the cement raw meal component, namely powdered limestone, is fed directly to the first stage unpreheated and the oil shale is fed separately to the combustion chamber where it is heated and the combustible constitutents thereof burned off and the heated oil shale component is then supplied to the second or third stage.

The apparatus for carrying out the method includes one or two hoppers, pneumatic pumps, metering devices for metering a cement raw meal-oil shale mixture or the cement raw meal and oil shale separately to the pumps, the combustion chamber, the preheater system and a rotary kiln.

36 Claims, 2 Drawing Figures

METHOD AND APPARATUS FOR PREHEATING AND BURNING OFF COMBUSTIBLE CONSTITUENTS OF RAW MATERIAL OIL SHALE PRIOR TO INTRODUCTION OF SAME INTO A PREHEATER SYSTEM SUPPLYING A ROTARY KILN

BACKGROUND OF THE INVENTION

1. Field of the Invention

The present invention relates to the use of raw materials containing kerogen (or other organic combustible constituents) for manufacture of Portland cement in a rotary kiln and suspension cyclone preheater system.

2. Description of the Prior Art

Heretofore use of kerogen containing raw materials posed difficulties for cement rotary kilns equipped with suspension cyclone preheaters. In this respect, combustion or organic combustible constituents in the lower cyclone stages brought about an imbalance in the maintenance of gas/material temperature in the preheater cyclones. Also there was a hazard of explosion in the cyclone preheater stages.

In copending application Ser. No. 310,771 for: METHOD AND APPARATUS FOR PREHEATING DRY RAW MEAL PRIOR TO THE INTRODUCTION OF THE MEAL INTO A SUSPENSION CYCLONE PREHEATER SYSTEM SUPPLYING A ROTARY KILN, filed contemporaneously herewith, the disclosure of which is incorporated herein by reference, there is disclosed a method and apparatus for preheat of raw meal prior to introduction of the raw meal into the first or later stage of a multistage cyclone preheater system. As will be described in greater detail hereafter, the present invention utilizes the teachings in the copending application Ser. No. 310,771 and adds to those teachings a method and apparatus for heating and burning the combustible kerogen constituents. This, as described hereinafter, in greater detail, is achieved by preheating the kerogen contained in the raw meal feed or the kerogen in added oil shale, etc. and bringing about combustion of the organic combustible kerogen constituent prior to entry of the feed and/or kerogen containing component into the preheater system. As described in the copending application serial no. additional oil, gas or pulverized coal is used as required in a separate combustion chamber to attain the desired raw meal preheat temperature. As taught by the present invention the kerogen constituent of the raw material/oil shale contributes part or all of the heat required.

It has heretofore been proposed to make Portland cement from oil shale and methods and apparatus heretofore proposed for making cement from oil shale are disclosed in the following U.S. Patents:

U.S. Pat. Nos. Patentee 2,904,445 Sellers et al.
3,127,455 Culbertson, Jr., et al.
3,135,618 Friese The Sellers U.S. Pat. 2,904,445 discloses a process for manufacturing Portland cement and recovery of oil from shale. Reference is made in this patent to the use of a shaft kiln which does not utilize finely ground dry raw meal feed as in the apparatus described in greater detail hereinafter.

The Culbertson, Jr. U.S. Pat. No. 3,127,455 utilizes a fluidized bed process for obtaining oil shale ash along with preheating of limestone component in a fluidized bed process system.

The Friese U.S. Pat. No. 3,135,618 teaches the heat treating of oil shale at 600° C. to remove volatile constituents of oil shale. The pretreated oil shale is then mixed with limestone to obtain a raw mix blend which is then sintered with limestone to obtain Portland cement clinker.

The method and apparatus of the present invention differ from the method and apparatus disclosed in the prior art patents by providing for the preheating and combustion of the kerogen constituent in a separate combustion chamber which is an integral part of a pneumatic transport system for conveying raw meal feed to a multistage cyclone preheater system.

Also according to the teachings of the present invention where oil shale is used as a raw mix constituent, it is optional to selectively preheat the oil shale component stream in the combustion chamber for burning away the kerogen. This preheated stream is then introduced into the preheater along with the unpreheated limestone component stream. Blending of the two streams is then achieved in the preheater.

The teachings of the method and apparatus of the present invention permit use of large reserves of kerogen containing raw material (inclusive of oil shales) for manufacture of Portland cement in presently available suspension cyclone preheater systems supplying rotary kilns. In particular it is possible to use raw materials with relatively lower proportions of organic combustible constituents, which would be unsuitable for recovery of oil or for other applications.

Where the kerogen content in the raw meal is relatively on the low side (contributing a heat of say 100 kcal/kg clinker) the raw meal could be preheated in the manner indicated in copending application serial no. with the advantage that only a marginal quantity of additional fuel is required for preheating of the raw meal to the desired extent (typically up to 400° C.). An auxiliary combustion chamber with a separate oil or gas burner can be provided if desired to ensure the maintenance of a steady raw meal temperature.

Also it will be understood that since the heat input is supplied to the lower stage cyclones, problems on account of accretions in the fourth stage cyclone preheater are minimized. The raw materials containing kerogen/carbonaceous constituents should, however, contain alkali, chloride and sulfate contents within the usual limits that apply to unpreheated raw meal feed that is fed into a suspension preheater system and kiln. Thus oil shales with high sulfur contents would not be usable.

SUMMARY OF THE INVENTION

According to the invention there is provided a method for processing a mixture of cement raw meal and oil shale kerogen said method including the steps of metering the dry raw meal mixture to a cement processing system, pneumatically pumping said raw meal in said processing system to a separate combustion chamber, supplying fuel to said combustion chamber and igniting same and the combustible constituent of said oil shale therein, heating said dry raw meal mixture in said combustion chamber to a temperature between 100° and 850° C., pumping said heated dry raw meal mixture to a preheater system, processing said dry raw meal mixture through said preheater system and supplying the preheated raw meal to a rotary kiln for making cement clinker whereby the temperature of the gas exiting from the preheater system is increased to provide recoverable heat, whereby oil shale (kerogen) fuel is utilized, and whereby the thermal efficiency of said kiln and preheater system is increased.

Also according to the invention there is provided an apparatus for processing a mixture of cement raw meal and oil shale, said apparatus including a hopper containing said mixture, a continuous pneumatic pump, means for metering said mixture to said pump from said hopper, a separate combustion chamber having an inlet coupled to the outlet of said pump, means for delivering fuel to the chamber, means for igniting said fuel and the combustible constituent of said oil shale in said chamber, said combustion of said fuel and said combustible constituent of said oil shale being controlled so as to heat said mixture therein to a temperature of between 100° and 850° C., a preheater system, means for delivering said preheated mixture to said preheater system, and a rotary kiln connected to the output of said preheater system.

DESCRIPTION OF THE PREFERRED EMBODIMENT

Figure 1:
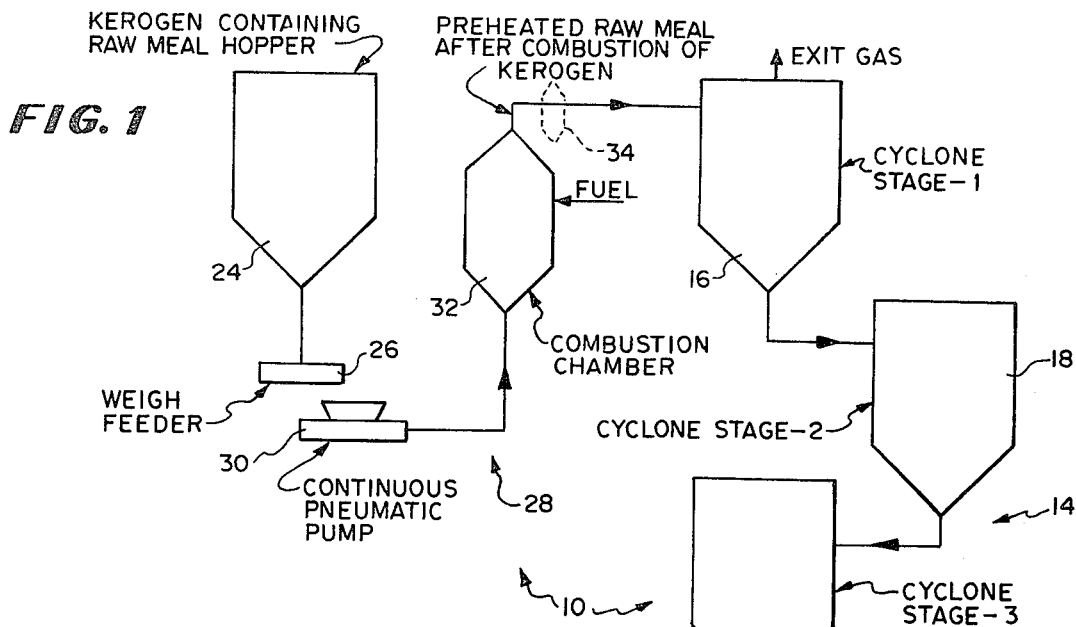
FIG. 1 is a block schematic diagram of the apparatus of the present invention including a hopper for dispensing a mixture of raw meal and oil shale into a processing system including a separate combustion chamber, a four stage preheater system which receives the output from the combustion chamber, and a rotary kiln which receives the preheated raw meal from the preheater system.

Referring now to FIG. 1 there is disclosed therein an apparatus 10 of the present invention adapted to carry out the method of the present invention. The apparatus 10 includes a rotary kiln 12 and a four stage preheater system 14, which are typically cyclone preheaters 16, 18, 20 and 22.

The apparatus 10 further includes a hopper 24 containing a mixture of oil shale and cement raw meal such as powdered limestone. This mixture is dispensed from the hopper 24 to a weigh feeder 26 which serves to meter the mixture to a pumping and heating system 28 comprising a continuous pneumatic pump 30, and a separate combustion chamber 32.

If desired, an auxiliary combustion chamber 34 can be connected between the output of the chamber 32 and the first cyclone stage 16. The auxiliary furnace 34 is shown in phantom.

The apparatus 10 described above is identical to the apparatus shown in copending application serial no. filed contemporaneously with this application and entitled: METHOD AND APPARATUS FOR PREHEATING DRY RAW MEAL PRIOR TO INTRODUCTION OF THE MEAL INTO A SUSPENSION CYCLONE PREHEATER SYSTEM SUPPLYING A ROTARY KILN, the disclosure of which is incorporated herein by reference.

According to teachings of the present invention, the mixture dispensed from the hopper 24 comprises limestone forming the cement raw meal, and kerogen content of 0.5% to 2% by weight of the mixture. This mixture is then pneumatically pumped to the combustion chamber 32 where fuel such as oil, gas or powdered coal is supplied to the combustion chamber and ignited by an oil or gas pilot flame. In burning the fuel and heating the mixture, the combustible constituent of the oil shale is also burned off. Since the combustible constituent of the oil shale can vary up to 300 kcals/kg clinker, the temperature of the heated meal leaving the combustion chamber 32 can range from 100° to 850° C. When the temperature is somewhere above 400°–500° C., a preheater system having less then 4 stages can be utilized. In this respect, for meal temperatures above 600° C., only two stages are needed and, when the temperature of the meal is above 800° C., only one stage preheater system is needed. Accordingly, the apparatus 10 can comprise a preheater system having one, two or four stages.

Where oil or carbonaceous shale, is to be used as a raw mix constituent, it is also practicable to feed the unpreheated, major limestone stream to a first stage cyclone along with a separate stream of oil shale component which is preheated in a combustion chamber prior to entry into the preheater system. This preheated component can be fed directly to a first stage cyclone preheater mixed with the unpreheated limestone component as disclosed in the above identified copending application serial no.

Figure 2:
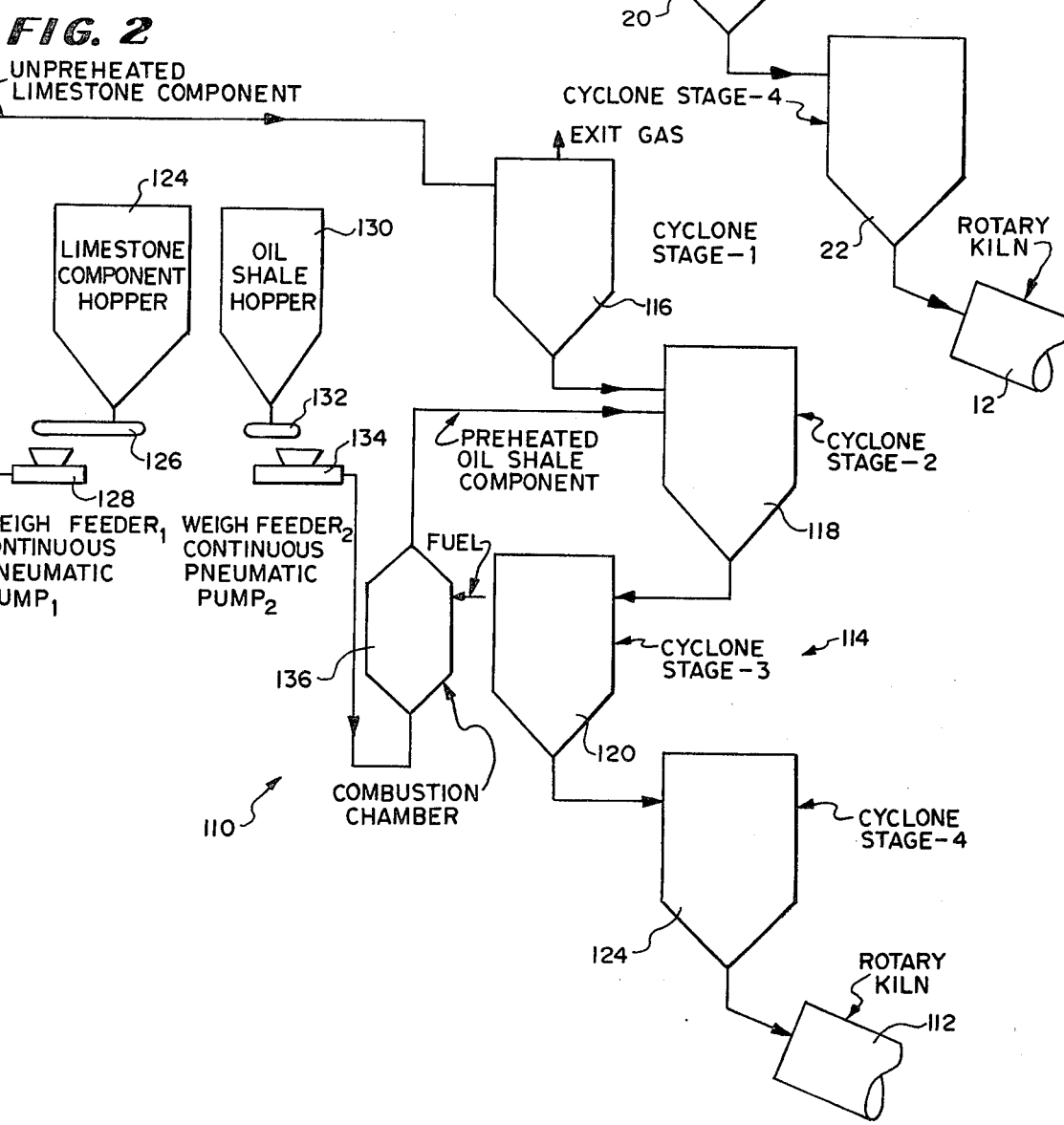
FIG. 2 is a block schematic diagram of another embodiment of the apparatus of the present invention including a four stage preheater system, a rotary kiln which receives the heated meal from the preheater system, a hopper for dispensing powdered limestone to a pumping system which pumps the unpreheated limestone to the first stage of the preheater system, an oil shale hopper, for dispensing oil shale to a pumping system for pumping the oil shale to a furnace where it is heated and then supplied to the second or third stage of the preheater system.

As a further modification, and with reference to FIG. 2, a preheated stream of oil shale component can be fed to a subsequent cyclone stage such as stage two or three of a four stage cyclone preheater.

Referring now in greater detail to FIG. 2, there is illustrated therein an apparatus for processing a mixture of limestone and oil shale. The apparatus 110 includes a rotary kiln 112 and a four stage cyclone preheater system 114 including a first stage 116, a second stage 118, a third stage 120 and a fourth stage 122.

The apparatus 110 further includes a limestone hopper 124 which dispenses the limestone component to a weigh feeder 126 which meters a predetermined amount of the powdered limestone to a continuous pneumatic pump 128 which feeds the unpreheated powdered limestone directly to the first stage cyclone preheater 116.

The apparatus 110 further comprises an oil shale hopper 130 which dispenses oil shale to a weigh feeder 132 which meters a predetermined amount of said shale to a continuous pneumatic pump 134 which then feeds the shale to a separate combustion chamber 136 where the kerogen containing component heated by a fuel such as coal, oil or gas which is ignited in the chamber 136. The combustion also serves to burn off the combustible constituent of the oil shale.

The preheated oil shale component which has been heated to a temperature of above 600° C. is then fed to the second stage cyclone preheater 118. As shown in phantom, this heated oil shale component can be fed to the third stage cyclone preheater 120.

As in the copending application, the fuel can be mixed in with the kerogen-raw meal mixture and fed with the mixture into the chamber 136. Likewise, powdered coal could be added to the oil shale component and fed with same to the combustion chamber 136.

When using materials with a higher proportion of kerogen, contributing say more than 100 kcals/kg clinker, the temperatures of the preheated raw meal and of the corresponding exit gas would be relatively high. Given below is a calculated indication of attainable preheat temperature for raw meal with different kerogen contents. Also indicated is the available heat content of the exit gas.

| % Kerogen content in raw meal | Heat contributed by kerogen (net kcal/kg clinker)* | Corresponding estimated raw meal temperature (°C.)** | Estimated temperature of gas leaving preheater (°C.)*** | Available heat content in exit gas (kcal/kg clinker)**** |
|---|---|---|---|---|
| 0.5 | 71 | 250 | 500 | 106 |
| 1.0 | 141 | 440 | 690 | 206 |
| 1.5 | 212 | 635 | 800 | 264 |
| 2.0 | 284 | 830 | 850 | 290 |

*Net calorific value of kerogen assumed to be 9000 cal/gm.
**Raw meal temperature assumed to be 50° C., and unpreheated raw material (excluding kerogen content)/clinker ratio assumed to be 1.55.
***Exit gas quantity is assumed to be 2.2 kg/kg clinker. In practice, this value will be progressively lower with increased raw meal feed temperature. Hence, exit gas temperature will be somewhat lower than the above indicated values.
****The available heat content in exit gas is based on the assumption that the gas is cooled to 300° C.

It will be noted that with kerogen contents of 1% and above, there is a substantial increase in the raw meal temperature—well over 400° C. Since kerogen in raw material is a relatively cheap fuel source, and since in any case it will have to be burned off before entry into the preheater system, for raw materials with higher kerogen content it would be permissible to preheat raw meal to a higher temperature of up to say 800° C. In such a case a suspension cyclone preheater system with less than four stages can be used. For optimum efficiency it would be necessary to utilize the available heat content of exit gases (having temperatures up to 850° C.), for example, by generation of electricity from a waste heat boiler. Incidentally, even if the heat content of exit gas is not utilized, overall fuel requirements (including the contribution of the kerogen content in raw meal) will not be substantially higher than when unpreheated raw meal is fed to a suspension cyclone preheater.

From the foregoing description it will be apparent that the method and apparatus of the present invention have a number of advantages, some of which have been described above and others of which are inherent therein. Moreover, many modifications can be made to the method and apparatus of the present invention without departing from the teachings therein. Accordingly, the scope of the present invention is only to be limited as necessitated by the accompanying claims.

I Claim:

1. A method for processing raw meal such as powdered limestone together with carbonaceous material or oil shale, said method including the steps of metering a quantity of powdered limestone into a first input stream in a cement processing system comprising a preheater system including at least a first stage cyclone preheater and one later stage cyclone preheater, said first stream leading directly to said first stage cyclone preheater, metering another quantity of oil shale and supplying it to a second input stream in said processing system, said second stream including a separate combustion chamber, supplying fuel to said combustion chamber and igniting said fuel and the compustible constituent of said oil shale, heating said oil shale in said combustion chamber to a temperature between 100° and 700° C., pumping said heated oil shale from said combustion chamber to said later stage cyclone preheater of said preheater system, processing said dry raw meal fed into said preheater system in said two streams through said cyclone preheater system to a rotary kiln for making cement clinker whereby the temperature of the gas exiting from the cyclone preheater system is increased so as to provide recoverable heat and whereby the thermal efficiency of said kiln and preheater system is increased.

2. The method according to claim 1 wherein said preheater system includes three stages and said later stage is the third stage.

3. The method according to claim 1 wherein the heat contribution of the combustible constituent of said oil shale is up to 100 kcals/kg clinker.

4. The method according to claim 3 wherein the heat contribution of the combustible constituent of said oil shale is approximately 200 kcals/kg clinkers.

5. The method according to claim 3 wherein the heat contribution of the combustible constituent of said oil shale is 100 kcals/kg clinkers or less.

6. The method according to claim 1 wherein said proportion of kerogen in said mixture is between 0.5 and 2% by weight.

7. A method for processing a mixture of cement raw meal and oil shale, said method including the steps of metering the dry raw meal mixture into a cement processing system, pneumatically pumping said raw meal in said processing system to a separate combustion chamber, supplying fuel to said combustion chamber and igniting same and the combustible constituent of said oil shale therein, heating said dry raw meal mixture in said combustion chamber to a temperature between 100° and 850° C., pumping said heated dry raw meal mixture to a preheater system, processing said dry raw meal mixture through said preheater system and supplying the preheated raw meal to a rotary kiln for making cement clinker wherby the temperature of the gas exiting from the preheater system is increased to provide recoverable heat and whereby kerogen (oil shale) fuel is utilized, and whereby the thermal efficiency fo said kiln and preheater system is increased.

8. The method according to claim 7 wherein the heat contribution of the combustible constituent of said oil shale is up to 300 kcals/kg clinker.

9. The method according to claim 8 wherein the heat contribution of the combustible constituent of said oil shale is approximately 200 kcals/kg clinker.

10. The method according to claim 7 wherein said proportion of kerogen in said mixture is between 0.5 and 2% by weight.

11. The method according to claim 8 wherein the heat contribution of the combustible constituent of said oil shale is 100 kcals/kg clinkers or less.

12. The method according to claim 7 wherein said plurality of preheaters comprises four stage cyclone preheaters.

13. The method according to claim 12 wherein precalcinating of the raw meal is effected between the third and fourth stages of the cyclone preheaters by passing the raw meal or a portion thereof through a precalcinator furnace.

14. The method according to claim 7 wherein the fuel supplied to the separate combustion chamber is selected from the class consisting of oil, gas and powdered coal.

15. The method according to claim 7 wherein the fuel is powdered coal and is supplied to the separate combustion chamber by mixing the powdered coal with the unpreheated dry raw meal mixture that is fed into the separate combustion chamber such that the fuel and dry raw meal mixture are fed simultaneously into the separate combustion chamber.

16. The method according to claim 7 wherein said fuel is ignited in the separate combustion chamber by an oil or gas pilot flame provided therein.

17. The method according to claim 7 wherein the air pressure generated by the pneumatic pump for pneumatically pumping the dry raw meal is approximately up to 2.8 kg/cm$^2$ and the air quantity per quantity of raw meal is approximately 1 kg air/10 kg raw meal.

18. The method according to claim 7 wherein the dry raw meal mixture feed temperature is raised in the separate combustion chamber to a temperature of approximately 350° C.

19. The method according to claim 7 wherein the exit gases from the preheater system are recovered and supplied to a waste heat boiler for generating steam.

20. The method according to claim 15 wherein said steam generated from said waste heat boiler is used for electric power generation.

21. The method according to claim 7 wherein air is fed to said first stage cyclone preheater and wherein the heat recovered from said exit gases is used to preheat said air fed to said first stage cyclone preheater.

22. An apparatus for processing a mixture of cement raw meal and oil shale, said apparatus including a hopper containing said mixture, a continuous pneumatic pump, means for metering said mixture to said pump from said hopper, a separate combustion chamber having an inlet coupled to the outlet of said pump, means for delivering fuel to said chamber, means for igniting said fuel and the combustible constituent of said oil shale in said chamber, said combustion of said fuel and said combustible constituent of said oil shale being controlled so as to heat said mixture therein to a temperature of between 100° and 850° C., a preheater system, means for delivering said preheated mixture to said preheated system, and a rotary kiln connected to the output of said preheater system.

23. The apparatus according to claim 22 wherein said preheater system includes a first stage cyclone preheater and at least one later stage cyclone preheater, and said preheated mixture is delivered to said first stage.

24. The apparatus according to claim 23 wherein said cyclone preheater system includes four serially connected cyclone preheater stages.

25. The apparatus according to claim 22 wherein said fuel is powdered coal which is mixed with said oil shale/cement raw meal mixture and said means for delivering fuel to said separate combustion chamber is defined by said pneumatic pumping means.

26. The apparatus according to claim 22 wherein said means for igniting said fuel is an oil or gas pilot flame in said separate combustion chamber.

27. The apparatus according to claim 22 including means for recovering the exit gases and heat therein from said cyclone preheater system.

28. The apparatus according to claim 27 including a waste heat boiler coupled to said means for recovering exit gases to generate steam.

29. The apparatus according to claim 28 wherein said waste heat boiler is part of an electric generation system.

30. The apparatus according to claim 27 including an air preheater in the input to a preheater fan for the cyclone preheater system and said recovered exit gases are fed to said air preheater for effecting heat transfer to the incoming air to heat said air which can be used in the preheated kiln system.

31. The apparatus according to claim 22 including a second separate combustion chamber between said first combustion chamber and said preheater system for further heating said mixture to maintain a stable temperature of the heated mixture delivered to said preheater system.

32. The apparatus according to claim 22 wherein said kerogen component of said mixture is 0.5 to 2% by weight of the mixture.

33. The apparatus according to claim 22 wherein the heat contribution of the combustible constituent of said oil shale is up to 300 kcals/kg clinkers.

34. An apparatus for processing cement raw meal and oil shale, said apparatus including a hopper for receiving the limestone component constituting said cement raw meal, a continuous pneumatic pump, means for metering limestone to said pump from said hopper, a preheater system having a first stage and at least one later stage, means coupling the outlet of said pneumatic pump to said first stage, a second hopper containing oil shale containing kerogen, a second continuous pump, second means for metering said oil shale to said pump from said hopper, a separate combustion chamber having an inlet coupled to the outlet of said second pump, means for delivering fuel to said combustion chamber, means for igniting said fuel and the combustible constituent of said oil shale in said chamber, said combustion of said fuel being controlled so as to heat said mixture therein to a temperature of between 100° and 700° C., means for delivering said heated oil shale with combustible constituents thereof burned off to a later stage of said preheater system, and a rotary kiln connected to the output of said preheater system.

35. The apparatus according to claim 34 wherein said preheater system includes at least three stages and said latter stage is said third stage.

36. The apparatus according to claim 34 wherein said preheater system includes at least four stages and said latter stage is said second stage or said third stage.

* * * * *